Patented Oct. 5, 1926.

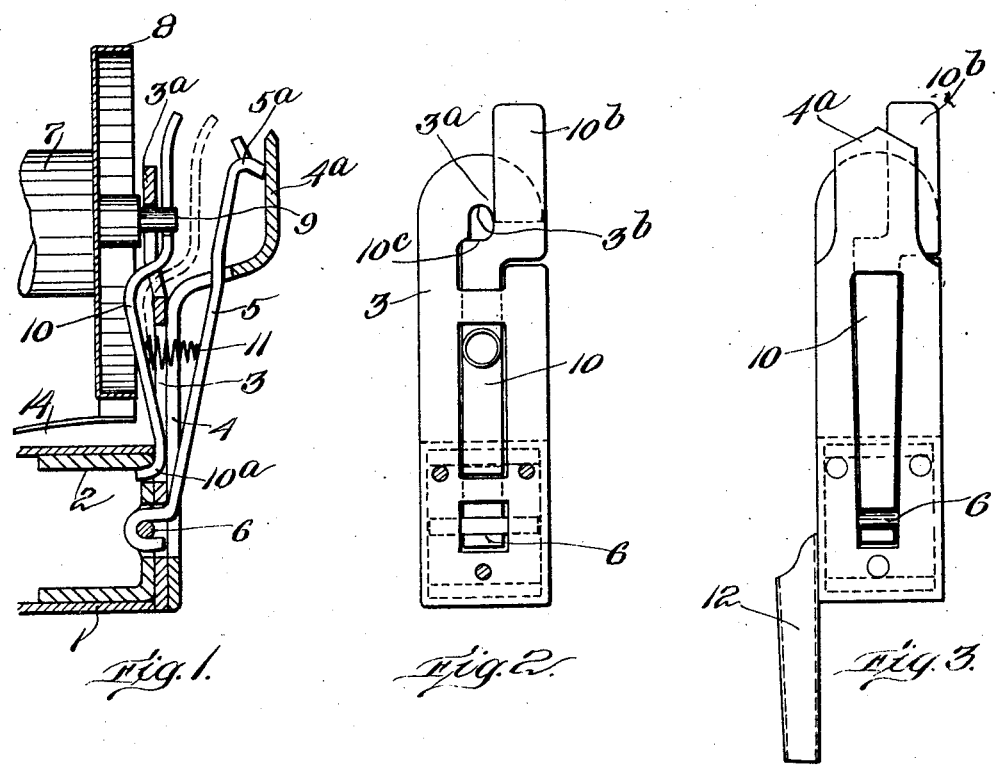

1,601,936

UNITED STATES PATENT OFFICE.

WALTER BIXBY, OF BOSTON, MASSACHUSETTS, ASSIGNOR TO SHAWMUT ENGINEERING COMPANY, OF BOSTON, MASSACHUSETTS, A CORPORATION OF MASSACHUSETTS.

TUBE FRAME FOR TUFT WEAVING.

Application filed November 6, 1923. Serial No. 673,053.

This invention relates to tube frames, such as are used in the art of tuft weaving, and is intended to provide a construction and arrangement to facilitate the insertion and removal of the yarn spool which carries the tuft yarn.

To this end the invention comprises, generally speaking, the combination of the bearing arm member of the frame which supports the spool journal, and is provided with a laterally opening slot, of a movable detent or latch so arranged as to have movement endwise of the spool to a position beneath the spool journal, thereby preventing accidental removal of the journal while facilitating the easy release of the journal when it is desired to remove the spool. Another feature of the present improvement is that the bearing is so arranged as to normally sustain the upward thrust of the usual brake against the spool, while the detent or latch presents the downward movement necessary to withdraw the spool journal laterally from the bearing member.

These and other features of the invention will be explained in the following specification and will be defined in the claims hereto annexed.

In the accompanying drawings I have illustrated a preferred form embodying the principles of this invention, in which:—

Figure 1 is a front elevation, chiefly in section, showing the end of the carrier bar and the suspension means in conjunction with the adjacent portion of the spool journal.

Figure 2 is an end elevation of the spool-supporting arm and journal-retaining latch.

Figure 3 is an end elevation showing the suspension means of the frame in conjunction with the spool-supporting and the journal-retaining latch.

In the practice of this invention, according to the form illustrated in the drawings, I employ a tubular carrier bar 1, in which is inserted and fastened a U-shaped attaching element 2 which serves to secure the spool-supporting arm 3, and the main suspension arm 4, rigidly to the carrier bar in a manner well understood in the art.

The main suspension arm 4, as is usually the case, is provided with an offset upwardly extending chain-penetrating or chain-engaging tongue 4ª, and cooperating with its suspension arm is a hook arm 5, whose lower end is bent into an open loop to pass around a supporting pin 6, on which it is fulcrumed, and whose upper end is provided with a chain-engaging hook 5ª so that when the hook arm is moved inwardly toward the spool, the hook 5ª is released from the carrier chain to allow the transfer of the tube frame and spool to the loom.

The spool bearing arm 3 is provided with a bearing aperture forming a bearing seat 3ᵇ, for the journal, the upper or journal-engaging boss of the arm 3, forming a sort of overhanging hook 3ª, which overhangs the supporting journal 9 of the spool 7, and which receives the upward thrust of the spool produced by the upward pressure of the brake member 14 against the head of the flange 8 of the spool.

Owing to the fact that the bearing element 3ª overhangs the journal, the bearing aperture 3ᵇ, will ordinarily support the journal in position, but it will be obvious that any accidental downward pressure on the spool might lead to displacing the spool journal entirely from its bearing since the bearing aperture is open on the side.

To prevent such accidental displacement I provide a journal-retaining latch 10, which is mounted in any suitable manner to permit movement into and out of operative journal-retaining position. In the present instance the retaining latch 10 has its lower end bent to form a partial hook passing into a fulcral aperture or bearing in the end of the tube frame, and its upper end 10ᵇ is laterally offset so as to leave a shoulder or ledge 10ᶜ which, in normal position, is located immediately beneath the spool journal 9.

It will be obvious that outward pressure of the latch 10 will serve to move it into the position shown in dotted lines in Figure 1, permitting the quick removal from the open bearing of the spool. The retaining latch is preferably kept in operative retaining position by means of a yielding or spring pressure, and for this purpose, in the present instance, I employ a coiled compression spring 11, which is interposed between the hook arm 5 of the suspension means, and the latch 10 so that the opposite thrust of this single spring serves to maintain each of these elements in their normal operative or active position, while allowing either of them to be moved to releasing position.

What I claim is:—

1. In a tube frame the combination of a longitudinal carier bar, an upwardly pressed yarn spool, a spool-bearing arm provided with an open bearing overhanging the journal to resist said upward thrust and a latch swingable to and from the spool journal endwise thereof and normally acting to prevent the escape of the journal from its bearing, substantially as described.

2. In a tube frame, the combination of a carrier bar, a yarn spool, a spool-bearing arm having a journal-engaging portion overhanging the spool journal and open on one side for admitting and removing the spool journal, and a journal-retaining latch movable axial of the journal into and out of journal-retaining position beneath the journal, substantially as described.

3. The combination of a yarn spool, a supporting frame comprising a carrier bar and cooperating suspension members, one of which is movable to releasably engage a carrier chain, a spool-bearing arm formed with an open bearing for the reception of the spool journal, a journal-retaining latch mounted on the frame and normally acting to prevent the escape of the bearing, and a spring interposed between the movable suspension member and the latch to yieldingly maintain each in its operative position, substantially as described.

4. The combination of a yarn spool, of a frame embracing a carrier bar, suspension means and a spool bearing member, said bearing member being provided with a journal-receiving open bearing aperture, a latch loosely fulcrumed in an aperture in the frame to permit a to and fro movement, said latch being normally presed into operative position beneath the journal to prevent the escape of the spool journal therefrom, substantialy as described.

5. A tube frame for weaving embracing in combination with a carrier-bar, a suspension bracket comprising co-acting chain-engaging suspension members, a spool-bearing arm provided with a journal bearing open on one side for the admisison and removal of a spool-journal, a journal-retaining latch swingable in the axial plane of the spool to close the open side of the journal bearing and present unyielding positive resistance to movement of the journal through the open side of the bearing.

In witness whereof, I have subscribed the above specification.

WALTER BIXBY.